(12) United States Patent
Ahnebrink

(10) Patent No.: US 10,969,896 B2
(45) Date of Patent: *Apr. 6, 2021

(54) DISPLAY METHOD AND ELECTRONIC DEVICE THEREOF

(71) Applicant: Lenovo (Beijing) Co., Ltd., Beijing (CN)

(72) Inventor: Alexander Ahnebrink, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,178

(22) Filed: Apr. 25, 2017

(65) Prior Publication Data

US 2017/0336949 A1 Nov. 23, 2017

(30) Foreign Application Priority Data

May 18, 2016 (CN) .......................... 201610330667.7

(51) Int. Cl.
| | |
|---|---|
| *G06F 3/041* | (2006.01) |
| *G06F 1/16* | (2006.01) |
| *G06F 3/0488* | (2013.01) |
| *G06F 3/147* | (2006.01) |
| *G09G 5/00* | (2006.01) |
| *G06F 3/0484* | (2013.01) |

(52) U.S. Cl.
CPC .......... *G06F 3/0416* (2013.01); *G06F 1/1626* (2013.01); *G06F 3/0488* (2013.01); *G06F 3/04845* (2013.01); *G06F 3/04886* (2013.01); *G06F 3/147* (2013.01); *G09G 5/00* (2013.01); *G09G 2340/14* (2013.01)

(58) Field of Classification Search
CPC .... G06F 3/04845; G06F 1/1626; G06F 3/147; G06F 3/0416; G09G 5/00
See application file for complete search history.

(56) References Cited

U.S. PATENT DOCUMENTS

| | | | |
|---|---|---|---|
| 9,134,835 B2 | 9/2015 | Novak et al. | |
| 2011/0109563 A1 | 5/2011 | Liu | |
| 2011/0316807 A1* | 12/2011 | Corrion | G06F 3/0412 345/174 |
| 2012/0075212 A1* | 3/2012 | Park | G06F 3/0488 345/173 |
| 2013/0135221 A1* | 5/2013 | Ainslie | G06F 3/038 345/173 |
| 2014/0055367 A1* | 2/2014 | Dearman | G06F 3/0488 345/173 |

(Continued)

FOREIGN PATENT DOCUMENTS

| | | |
|---|---|---|
| CN | 102511032 A | 6/2012 |
| CN | 104615303 A | 5/2015 |

*Primary Examiner* — Roland J Casillas (74) *Attorney, Agent, or Firm* — Anova Law Group, PLLC (57) ABSTRACT

A display method and an electronic device are provided. The display method includes sensing a first operation performed on a display screen of an electronic device. The display method also includes determining a first contact area of the display screen corresponding to the first operation based on information of the first operation. Further, the display method includes adjusting a first display area of the display screen to a second display area based on information of the first contact area.

14 Claims, 4 Drawing Sheets

(56) References Cited

U.S. PATENT DOCUMENTS

| | | | |
|---|---|---|---|
| 2014/0282228 A1* | 9/2014 | Pelissier | G06F 3/0416 715/788 |
| 2015/0062206 A1* | 3/2015 | Osborne | G06F 1/1643 345/698 |

\* cited by examiner

DISPLAY METHOD AND ELECTRONIC DEVICE THEREOF

CROSS-REFERENCES TO RELATED APPLICATIONS

This application claims the priority of Chinese patent application No. 201610330667.7, filed on May 18, 2016, the entirety of which is incorporated herein by reference.

FIELD OF THE DISCLOSURE

The present disclosure generally relates to the field of electronic device display and, more particularly, relates to a display method and an electronic device thereof.

BACKGROUND

With the continuous development of science and technology, electronic technology has also been rapidly developed, and the variety of electronic products is increasing. People are enjoying all kinds of convenience bought by the development of science and technology. Electronic devices with improved ease of operation and convenience through the use of touch screens are becoming more common in the marketplace. In recent years, touch screens of portable electronic devices that people usually use, such as mobile phone, are becoming bigger. Thus, performance of the electronic devices is becoming higher, and endurance and cooling capacity of the electronic devices are becoming better.

Currently, many electronic devices include touch screens. It is more convenient that user can directly perform an operation with fingers. However, when the user's hand holds an electronic device having a touch screen, the hand may accidentally hit the touch screen, resulting in erroneous response of the electronic device. The disclosed display method and electronic device are directed to solve one or more problems set forth above and other problems.

BRIEF SUMMARY OF THE DISCLOSURE

One aspect of the present disclosure includes a display method. The display method includes sensing a first operation performed on a display screen of an electronic device. The display method also includes determining a first contact area of the display screen corresponding to the first operation based on information of the first operation. Further, the display method includes adjusting a first display area of the display screen to a second display area based on information of the first contact area.

Another aspect of the present disclosure includes an electronic device. The electronic device includes a display screen, a sensor and a processor, wherein the sensor senses a first operation performed on the display screen; and the processor determines a first contact area of the display screen corresponding to the first operation based on information of the first operation sensed by the sensor, and also adjusts a first display area of the display screen to a second display area based on information of the first contact area.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

The disclosed embodiments in the present disclosure are merely examples for illustrating the general principles of the invention. Any equivalent or modification thereof, without departing from the spirit and principle of the present invention, falls within the true scope of the present invention.

Moreover, in the present disclosure, the term "and/or" may be used to indicate that two associated objects may have three types of relations. For example, "A and/or B" may represent three situations: A exclusively exists, A and B coexist, and B exclusively exists. In addition, the character "/" may be used to indicate an "exclusive" relation between two associated objects.

The present disclosure provides a display method and an electronic device. In the present disclosure, an electronic device may include a mobile phone, a tablet computer (PAD), and other different electronic devices as long as having display screens.

Figure 1:
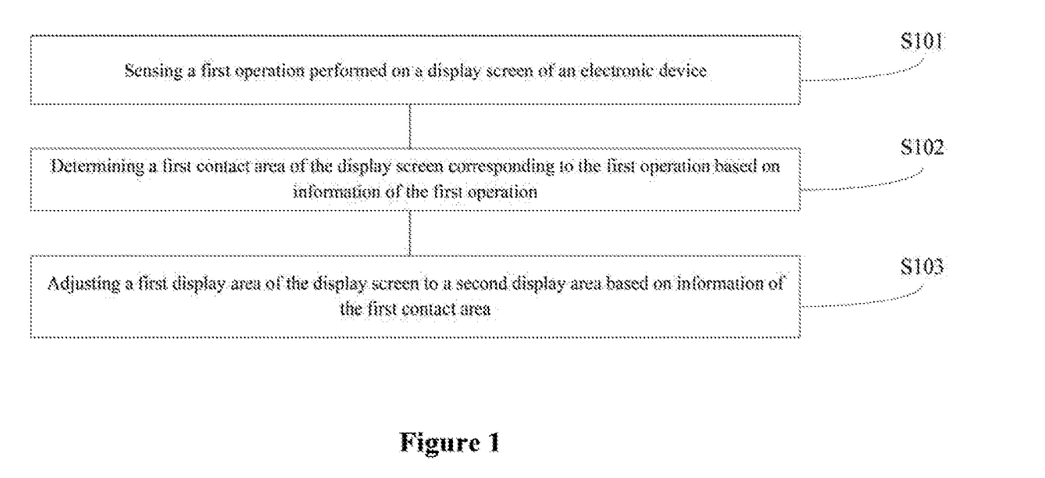
FIG. 1 illustrates a flow chart of a display method consistent with disclosed embodiments.

FIG. 1 illustrates a flow chart of a display method consistent with disclosed embodiments. As shown in FIG. 1, the display method may include the following steps.

Step 101: Sensing a first operation performed on a display screen of an electronic device.

Step 102: Determining a first contact area of the display screen corresponding to the first operation based on the information of the first operation.

Step 103: Adjusting a first display area to a second display area based on the information of the first contact area.

In one embodiment, for example, the display screen may be a touch display screen. The electronic device may receive the user's operation through the touch display screen.

In one embodiment, for example, the touch display screen may include a capacitive touch display, a resistive touch screen, or other available touch display screens.

In one embodiment, the first operation may be an operation performed on at least partial area of the display screen. For example, the first operation may be an operation in contact with partial area or entire area of the display screen. In another embodiment, the first operation may be an operation where an operation body for performing the first operation may not be in contact with the display screen, while a distance between the operation body and the display screen may be less than a predetermined distance and the operation body may block at least partial area of the display screen. The predetermined distance may be the maximum distance at which the operation body can be sensed by sensing element coupled to the electronic device. For example, the predetermined distance may be approximately 5 mm or less. The predetermined distance may also be other distances.

In one embodiment, the information of the first operation may include coordinate of each point in the contacting area between the operation body for performing the first operation and the touch screen in a predetermined coordinate system. In another embodiment, when the operation body for performing the first operation may not be in contact with the display screen, while the distance between the operation body and the display screen may be less than the predetermined distance and the operation body may block at least partial area of the display screen, the information of the first operation may include coordinate of each point in at least the partial area in the predetermined coordinate system. The area, determined on the display screen based on the information of the first operation, may be a first contact area.

In one embodiment, the first display area may include entire display area of the display screen, or partial display area of the display screen. Further, the first display area may include at least portions of the first contact area. A second display area may include remaining display area excluding the first contact area in the entire display area of the display screen, or the second display area may include the entire display area of the display screen.

In one embodiment, adjusting the first display area to the second display area based on the information of the first contact area may include the following. The entire contents displayed in the first display area may be adjusted in a predetermined ratio, and the display area on the display screen occupied by the adjusted entire contents may be the second display area. In this case, the first display area may include the first contact area and the second display area may not include the first contact area. In other words, the display in the first contact area may be stopped and the displayed entire contents may be scaled down, thus the reduced entire contents may continue to be displayed and may not be displayed in the first contact area. Therefore, the user can normally view the entire contents, and error touch performed on the user's hand-held position may be avoided.

Figure 2A:
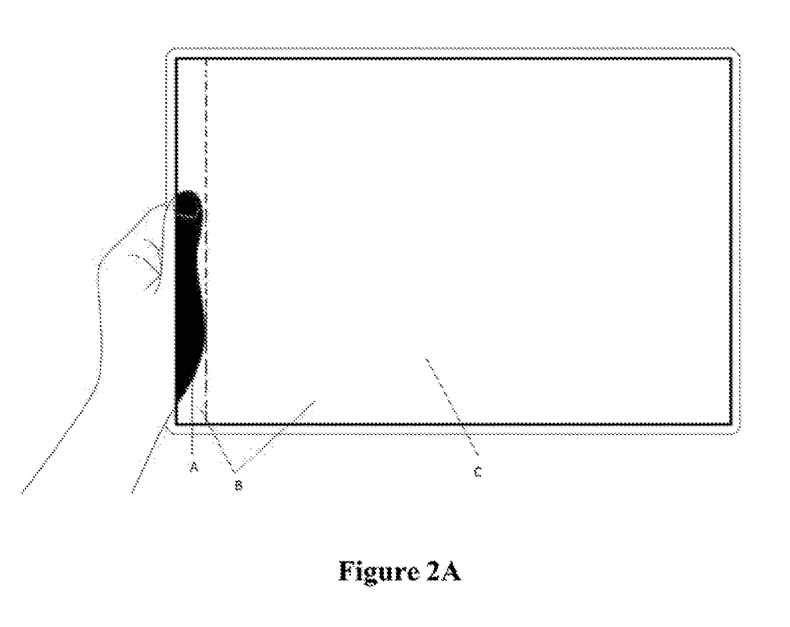
FIG. 2A illustrates a schematic display where the display in a first contact area is stopped and the entire displayed contents are scaled down and, thus, the reduced entire contents can continue to be displayed and cannot be displayed in the first contact area consistent with disclosed embodiments.

Referring to FIG. 2A, for example, the electronic device may be a PAD having a touch screen. In one embodiment, the user may hold the PAD with left hand, in other words, the user may perform the first operation on the PAD through the left hand. The PAD may sense the first operation and determine the contact area between the first operation and the touch screen. In other words, the first contact area may be determined, and, for example, may be shown as area A in FIG. 2A. The first display area may include the entire display area of the touch screen of the PAD, and may be shown as area B in FIG. 2A. The entire contents originally displayed on the touch screen may be scaled down in a predetermined ratio based on the size of the area A, and the area for displaying the reduced entire contents may refer to area C. The area C may be the second display area.

In another embodiment, adjusting the first display area to the second display area based on the information of the first contact area may include the following. The display in the first contact area may be stopped, and the entire contents may continue to be normally displayed in remaining area excluding the first contact area in the first display area. In this case, the second display area may include the remaining area excluding the first contact area in the first display area. Or the second display area may be a same display area as the first display area, when the display area thereof refers to the second display area, the contents in the first contact area in the display area thereof may not be displayed.

Figure 2B:
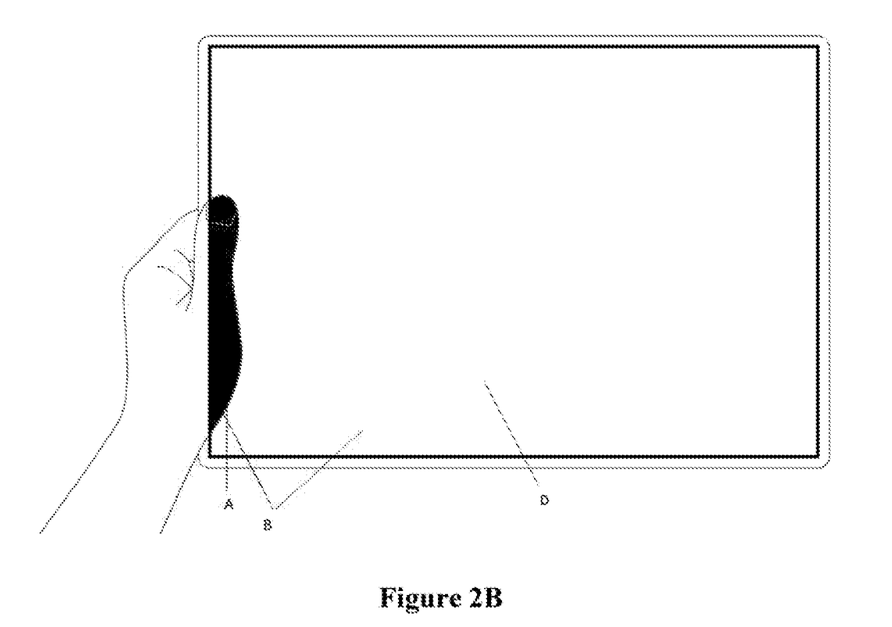
FIG. 2B illustrates a schematic display where the display in a first contact area is stopped, and the entire displayed contents can continue to be normally displayed in other remaining area excluding the first contact area in a first display area consistent with disclosed embodiments.

Referring to FIG. 2B, for example, the electronic device may be a PAD having a touch screen. In one embodiment, the user may hold the PAD with left hand. In other words, the user may perform the first operation on the PAD through the left hand. The PAD may sense the first operation and determine the contact area between the first operation and the touch screen. In other words, the first contact area may be determined, and, for example, may be shown as area A in FIG. 2B. The first display area may include the entire display area of the touch screen of the PAD, and may be shown as area B in FIG. 2B.

According to the size of the area A, the display in the area A may be stopped, and the entire contents can continue to be normally displayed in other remaining area excluding the area A in the area B. The other remaining area excluding the area A in the area B may refer to area D. In one embodiment, the second display area may be the area D. In another embodiment, the second display area may be a same display area as the area B, when the display area thereof refer to the second display area, the contents in the area A in the display area thereof may not be displayed.

In one embodiment, before adjusting the first display area of the display screen to the second display area based on the information of the first contact area, it may be determined whether the first contact area is in a predetermined area of the display screen. If the first contact area is in the predetermined area, the first display area of the display screen can be adjusted to the second display area. If the first contact area is not in the predetermined area, the adjustment may not be performed.

In one embodiment, the predetermined area may be any area predetermined in the display screen. For example, because the edge of the electronic device is generally the user's hand-held position, the edge area of the display screen may be set as the predetermined area to avoid error touch.

For another example, if the forward direction of the display screen may be defined as the forward direction of the displayed contents, the user may generally hold the left or right side of the display screen, thus the left edge area and/or the right edge area of the display screen may be set as the predetermined area.

For another example, the upper edge area and/or the lower edge area of the display screen may also be set as the predetermined area. The position of the predetermined area is not limited in the present disclosure. The user may perform some operations on the display screen with hands in addition to holding an electronic device with hands, some portions of the hand may also be in contact with the display screen during the normal operation, thus a contact area may be formed.

If the display area of the electronic device is adjusted based on the contact area, although it is an error operation for the user, it may increase the unnecessary workload and the error response rate for the electronic device. Therefore, the predetermined area may be set. If the first contact area is not in the predetermined area, the electronic device may not response to reduce the error response rate of the electronic device and to ensure the user's normal operation.

Before adjusting the first display area to the second display area, if the first contact area is in the predetermined area, it may also be determined whether a duration of the first operation is larger than a predetermined duration. If the duration of the first operation is larger than the predetermined duration, the first display area of the display screen may be adjusted to the second display area. If the duration of the first operation is smaller than or equal to the predetermined duration, the adjustment may not be performed. For example, sometimes the user may only occasionally hold the electronic device, and may not want to operate the electronic device. For another example, the user may unintentionally hit the display screen of the electronic device with hands. If the electronic device responds to these error operations, the workload is huge for the electronic device, and sometimes the response is unnecessary.

Therefore, the response of the electronic device may be as effective as possible by judging the duration of the first operation. If the duration of the first operation performed by the user is larger than the predetermined duration, the user may not perform operations, such as opening an application, on the electronic device, and nor unintentionally hit the display screen of the electronic device. The user may perform some other operations that may be unintentionally performed on the electronic device but may block the display area for a long time. If the duration of the first operation performed by the user is less than or equal to the predetermined duration, the user may perform an error operation on the electronic device, or may perform operations, such as opening an application, on the electronic device. Therefore, the effective response rate of the electronic device may be improved.

In one embodiment, the predetermined duration may be set based on the situations. For example, the predetermined duration may be set based on the user's general operating habits, or may be set based on other ways. For example, the predetermined duration may be set by the electronic device, or may be set by the user, etc. For example, when setting the predetermined duration, the predetermined duration may be larger than the duration for the user to perform an error operation on the electronic device or to perform operations, such as opening an application, on the electronic device. On the one hand, for example, the contact between the hand and the display area caused by the user holding the electronic device, and the contact between the operation body, such as hand or a stylus, and the display area caused by the user's intentional operation performed on the electronic device may be distinguished by setting the predetermined duration. Normally, if the user intentionally performs operations on the electronic device and the operation body is in contact with the display area, the duration may not be too long, thus the predetermined duration may be set larger than the duration of normal operations.

In another embodiment, adjusting the first display area to the second display area based on the information of the first contact area may include the following. A first coordinate of the first contact area in the first display area may be determined, and the first display area may be scaled down along a predetermined first direction based on the first coordinate to obtain the second display area.

In one embodiment, the first coordinate may be a coordinate in the predetermined coordinate system. Points in the predetermined coordinate system may include all points on the entire display screen. A first alternative method of establishing the predetermined coordinate system may include the following. One edge of the display screen may be on a longitudinal axis of the predetermined coordinate system, and origin may be any point on the longitudinal axis. For example, the origin may be the midpoint of the longitudinal axis. The horizontal axis may be perpendicular to the longitudinal axis, and the forward direction of the horizontal axis may be the predetermined first direction, i.e., the direction from the origin to the center of the display screen.

A second alternative method of establishing the predetermined coordinate system may include the following. The origin of the predetermined coordinate system may be the intersection of the two edges of the display screen. Diagonal of the display screen passing through the origin may be on the horizontal axis. The forward direction of the horizontal axis may be a direction from the origin to the center of the display screen, i.e., the predetermined first direction. The longitudinal axis may be perpendicular to the horizontal axis. The predetermined coordinate system may also be established by other methods.

In one embodiment, determining the first coordinate of the first contact area in the first display area may include the following. The coordinates of points on the outer contour trajectory of the first contact area may be first determined, and then a coordinate of the farthest point on the outer contour trajectory along the predetermined first direction may be determined as the first coordinate.

In one embodiment, if the first contact area intersects one edge of the display screen, the predetermined coordinate system may be established by the first alternative method. The edge of the display screen intersecting the first contact area may be on the longitudinal axis. If the first contact area is all within the predetermined area, the first coordinate may be a coordinate of the farthest point on the outer contour trajectory of the first contact area along the forward direction of the horizontal axis. If the number of the farthest points on the outer contour trajectory of the first contact area along the forward direction of the horizontal axis is more than one, the first coordinate may be a coordinate of any one point among all the farthest points on the outer contour trajectory of the first contact area along the forward direction of the horizontal axis. A straight line, including a point indicated by the first coordinate and parallel to the longitudinal axis, may be determined. Display in an area between the straight line thereof and the longitudinal axis, and originally belonging to the first display area may be stopped. The remaining area excluding the area thereof of the first display area may be the second display area.

Figure 3:
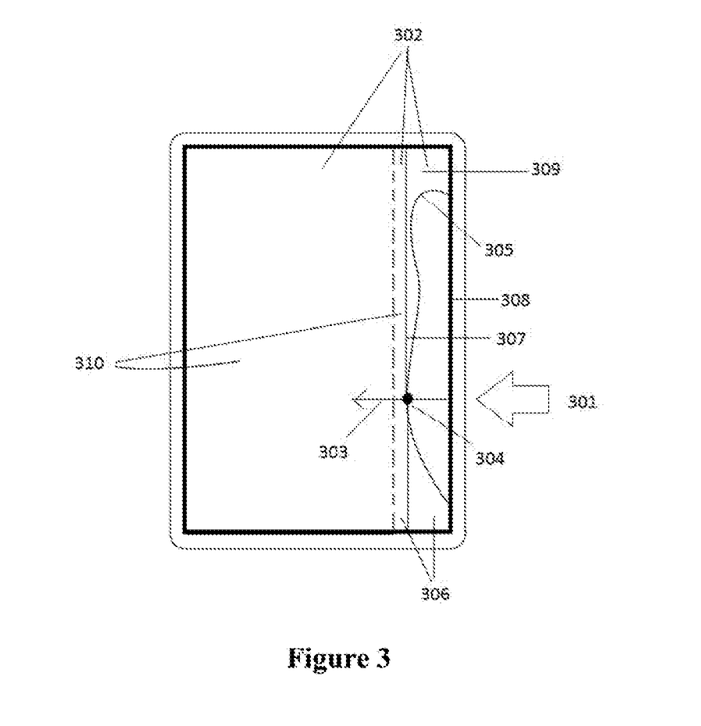
FIG. 3 illustrates a schematic display where a first display area is adjusted to a second display area according to a first alternative method of establishing a predetermined coordinate system consistent with disclosed embodiments.

Referring to FIG. 3, for example, the display screen 301 may be a rectangular. The first display area 302 may be the entire display area of the display screen 301. The first contact area 305 may intersect the edge 308 of the display screen 301. Thus, the edge 308 of the display screen 301 may be on the longitudinal axis of the predetermined coordinate system. The forward direction of the horizontal axis of the predetermined coordinate system may be the predetermined first direction 303. Because the first contact area 305 may be all within the predetermined area 306, the first coordinate may be the coordinate of a point having the maximum abscissa among the points on the outer contour trajectory of the first contact area 305.

The straight line 307 may include the point 304 indicated by the first coordinate and be parallel to the edge 308. The display in the area 309 of the display screen 301 between the straight line 307 and the edge 308 may be stopped. The remaining area of the display screen 301 may be the second display area 310. The resolution of the display screen 301 may be adjusted, and the adjusted resolution may be the same as the size of the second display area 310. The contents originally displayed in the first display area 302 may be displayed through the second display area 310.

If the first contact area 305 intersects the two non-parallel edges of the display screen 301, the predetermined coordinate system may be established by the second alternative method. The origin may be the intersection of the two non-parallel edges of the display screen 301 intersecting the first contact area 305. If the first contact area 305 is all within the predetermined area 306, the first coordinate may be the coordinate of the farthest point on the outer contour trajectory of the first contact area 305 along the forward direction of the horizontal axis. If the number of the farthest points on the outer contour trajectory of the first contact area 305 along the forward direction of the horizontal axis is more than one, the first coordinate may be the coordinate of the point having the maximum absolute value of the ordinate among all the farthest points on the outer contour trajectory of the first contact area 305 along the forward direction of the horizontal axis. Starting from the origin, the first display area 302 may be scaled down along the forward direction of the horizontal axis until the outer contour trajectory of the display area intersects the point 304 indicated by the first coordinate, thus the second display area 310 may be obtained.

In one embodiment, at least portions of the first contact area 305 may be outside the second display area 310. For example, when the first contact area 305 has a partial area within the predetermined area 306, the portion of the first contact area 305 within the predetermined area 306 may be outside the second display area 310, and the portion of the first contact area 305 outside the predetermined area 306 may be within the second display area 310. In one embodiment, when the first contact area 305 has a partial area within the predetermined area 306, the first coordinate may be a coordinate of the point having the maximum abscissa on the outer contour trajectory of the partial area of the first contact area 305 within the predetermined area 306. If the number of points having the maximum abscissa on the outer contour trajectory of the partial area of the first contact area 305 within the predetermined area 306 is more than one, the first coordinate may be a coordinate of the point having the maximum absolute value of the ordinate among the points having the maximum abscissa on the outer contour trajectory of the partial area of the first contact area 305 within the predetermined area 306.

Figure 4A:
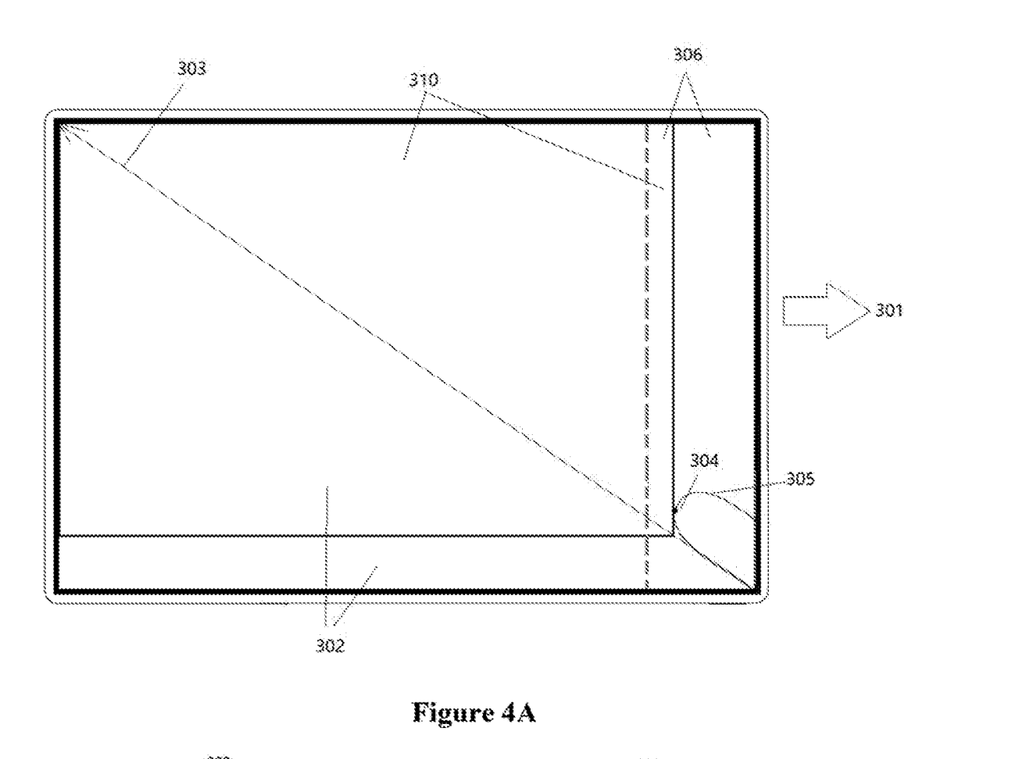
FIG. 4A illustrates a schematic display where a first display area is adjusted to a second display area according to a second alternative method of establishing a predetermined coordinate system when a first contact area is all located in a predetermined area consistent with disclosed embodiments.

Referring to FIG. 4A, for example, the display screen 301 may be a rectangular. The first display area 302 may be the entire display area of the display screen 301. The first contact area 305 may intersect two non-parallel edges of the display screen 301. The origin may be the intersection of the two non-parallel edges thereof. Diagonal of the display screen 301 passing through the origin may be on the horizontal axis. The forward direction of the horizontal axis may be a direction from the origin to the center of the display screen 301, i.e., the predetermined first direction 303. If the first contact area 305 is all within the predetermined area 306, the predetermined first direction 303 may be parallel to any diagonal of the display screen 301.

When the outer contour trajectory of the first contact area 305 is all within the predetermined area 306, the point 304 indicated by the first coordinate may be the farthest point on the outer contour trajectory of the first contact area 305 along the predetermined first direction 303. According to the first coordinate, the size of the first display area 302 may be scaled down along the predetermined first direction 303 to obtain the second display area 310. The resolution of the display screen 301 may be adjusted, and the adjusted resolution may be the same as the size of the second display area 310.

Figure 4B:
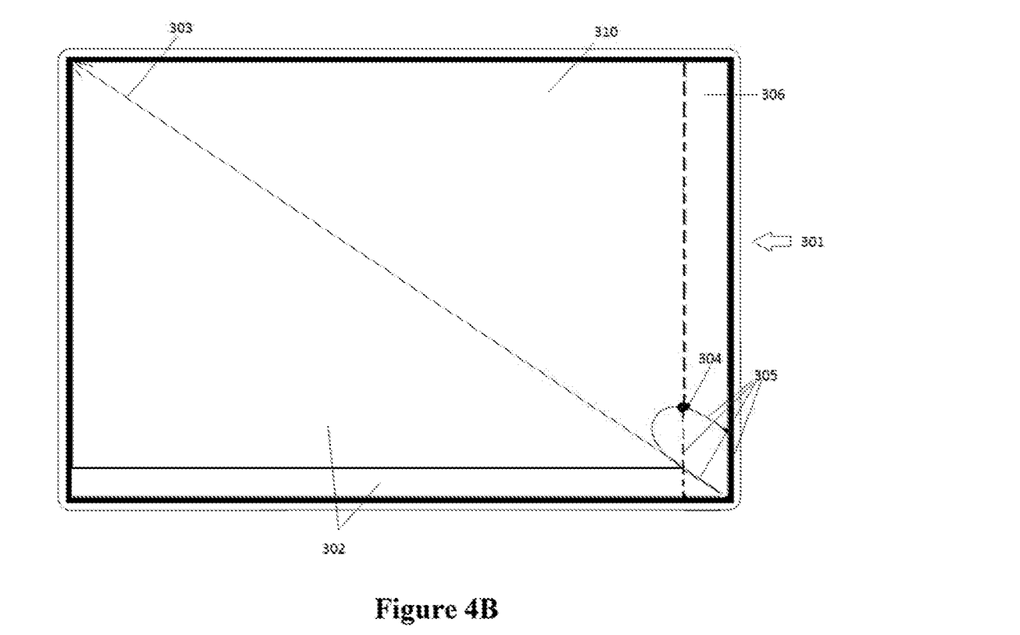
FIG. 4B illustrates a schematic display where a first display area is adjusted to a second display area according to a second alternative method of establishing a predetermined coordinate system when a first contact area is partially located in a predetermined area consistent with disclosed embodiments.

In another embodiment, referring to FIG. 4B, when the outer contour trajectory of the first contact area 305 is partially within the predetermined area 306, the point 304 indicated by the first coordinate may be the farthest point on the outer contour trajectory of the overlapping area between the first contact area 305 and the predetermined area 306 along the predetermined first direction.

In one embodiment, when responding a plurality of different first operations, the operations may be performed in series or in parallel. For every first operation, response may be made based on the methods provided in the various embodiments of the present disclosure.

Figure 5:
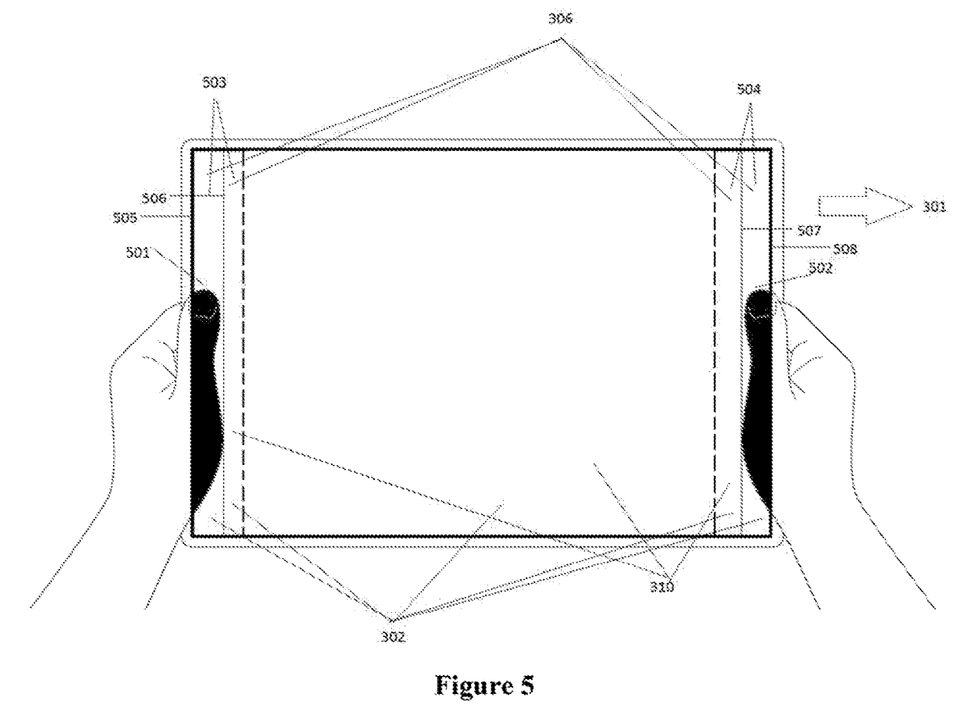
FIG. 5 illustrates a schematic display where a first display area is adjusted to a second display area according to the method shown in FIG. 3 when responding two different first operations consistent with disclosed embodiments.

In one embodiment, the predetermined area 306 may include at least one closed area. If the predetermined area 306 includes a plurality of closed areas, the plurality of closed areas may or may not be adjacent to each other. Referring to FIG. 5, for example, a first operation may be performed on the left edge area 501 of the display screen 301, and another first operation may be performed on the right edge area 502 of the display screen 301. The time difference of occurrence of the two first operations may be 0.1 seconds, and the two first operations may end at the same time.

The predetermined area 306 may include a first predetermined area 503 and a second predetermined area 504. On the one hand, when the first operation performed on the left edge area 501 of the display screen 301 is sensed, a coordinate system may be established for the operation thereof. The edge 505 of the display screen 301 intersecting the left edge area 501 may be on the longitudinal axis of the coordinate system established for the first operation performed on the left edge area 501 of the display screen 301. The origin may be the midpoint of the edge 505. The forward direction of the horizontal axis may be a direction from the origin to the center of the display screen 301. The straight line 506 may include a point having the maximum abscissa on the outer contour trajectory of the left edge area 501 and be parallel to the edge 505.

Because the first contact area, i.e., the left edge area 501, may be all within the first predetermined area 503, the display in partial area of the display screen 301 between the straight line 506 and the edge 505 may be stopped. On the other hand, similarly, when the first operation performed on the right edge area 502 of the display screen 301 is sensed, another coordinate system may be established for the operation thereof. The edge 508 of the display screen 301 intersecting the right edge area 502 may be on the longitudinal axis of the coordinate system established for the first operation performed on the right edge area 502 of the display screen 301. The origin may be the midpoint of the edge 508. The forward direction of the horizontal axis may be a direction from the origin to the center of the display screen 301.

The straight line 507 may include a point having the maximum abscissa on the outer contour trajectory of the right edge area 502 and be parallel to the edge 508. Because the first contact area, i.e., the right edge area 502, may be all within the second predetermined area 504, the display in partial area of the display screen 301 between the straight line 507 and the edge 508 may be stopped. The remaining area of the display screen 301 for displaying may be the second display area 310. The resolution of the display screen 301 may be adjusted, and the adjusted resolution may be the same as the size of the second display area 310. The contents originally displayed in the first display area 302 may be displayed through the second display area 310.

Other adjustment methods may also be used. For example, the adjustment method for responding may be performed based on the second alternative method of establishing the predetermined coordinate system. In addition, the first operation may also be an operation performed on the upper edge area of the touch display screen 301, or an operation performed on the lower edge area of the touch display screen 301, etc. The first operation may also be performed on other positions.

In one embodiment, if the sensed first operation ends, the second display area 310 may be adjusted to the first display area 302. For example, before adjusting the first display area of the display screen to the second display area, the coordinates of at least one vertex, which coordinates will be changed, in the first display area may be stored in the electronic device. When the sensed first operation is ended, the size of the second display area 310 may be enlarged along the opposite direction of the predetermined first direction 303 based on the first coordinate until the coordinates of at least one vertex, which coordinates will be changed, in the first display area become the same as the stored coordinates.

Because the first display area 302 may be the entire display area of the display screen 301 and be larger than the second display area 310, the second display area 310 may be automatically and promptly adjusted back to the first display area 302 after the first operation is ended. Therefore, the users may quickly re-enjoy the best display.

In another embodiment, when the sensed first operation is ended, before adjusting the second display area to the first display area, the second display area 310 may be held for a predetermined period of time, and whether a new first operation performed on the display screen 301 of the electronic device may be detected. If the new first operation is sensed, the display area of the electronic device may be adjusted based on the information of the new first operation. If the new first operation is not sensed within the predetermined period of time, the second display area 310 may be adjusted to the first display area 302.

For example, if the user holds a same position of the display screen 301 a plurality of times, every time the grip is released for a period of time and then held again. The duration of every release may be within the predetermined period of time. The display contents may be always displayed through the second display area 310, instead of adjusting the second display area 310 to the first display area 302 when releasing and adjusting the first display area 302 to the second display area 310 when holding. Therefore, the workload of electronic device may be saved.

In another embodiment, when the sensed first operation is ended, the second display area 310 may be held, and then a second operation performed on the display screen 301 of the electronic device may be sensed. The second display area 310 may be adjusted to the first display area 302 based on the information of the second operation.

For example, an option whether to restore the first display area 302 may be displayed when the sensed first operation is ended, and then the second operation of the selection 'yes' or 'no' may be sensed. Whether the second display area 310 is adjusted to the first display area 302 may be determined based on the information of the second operation. Therefore, unnecessary adjustments may be avoided through the user's active choice to reduce the workload of the electronic device.

Figure 6:
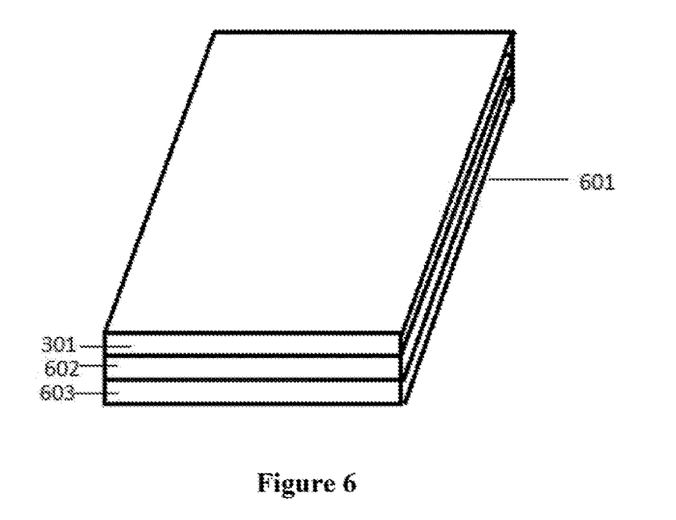
FIG. 6 illustrates a structural diagram of an electronic device consistent with disclosed embodiments.

An electronic device is also provided in the present disclosure. Referring to FIG. 6, an electronic device 601 may include a display screen 301, a sensor 602, and a processor 603. The sensor 602 may sense the first operation performed on the display screen 301. The processor 603 may determine the first contact area 305 of the display screen 301 corresponding to the first operation based on the information of the first operation sensed by the sensor 602. The processor 603 may also adjust the first display area 302 of the display screen 301 to the second display area 310 based on the information of the first contact area 305. In one embodiment, the size of the second display area 310 may be smaller than that of the first display area 302.

In one embodiment, in addition, the processor 603 may determine whether the first contact area 305 is in the predetermined area 306 of the display screen 301 before adjusting the first display area 302 to the second display area 310 based on the information of the first contact area 305. If the first contact area 305 is in the predetermined area 306, the processor 603 may adjust the first display area 302 to the second display area 310.

In one embodiment, before adjusting the first display area 302 of the display screen 301 to the second display area 310, moreover, the processor 603 may determine whether the duration of the first operation is larger than the predetermined duration if the first contact area 305 is in the predetermined area 306. If the duration of the first operation is larger than the predetermined duration, the processor 603 may adjust the first display area 302 of the display screen 301 to the second display area 310.

Adjusting the first display area 302 of the display screen 301 to the second display area 310 based on the information of the first contact area 305 by the processor 603 may include the following. The first coordinate of the first contact area 305 in the first display area 302 may be first determined, and then the size of the first display area 302 may be scaled down along the predetermined first direction 303 based on the first coordinate to obtain the second display area 310.

In one embodiment, at least portions of the first contact area 305 may be outside the second display area 310. Determining the first coordinate of the first contact area 305 in the first display area 302 by the processor 603 may include the following. The outer contour trajectory of the first contact area 305 may be first determined, and then a coordinate of the farthest point on the outer contour trajectory along the predetermined first direction 303 may be determined as the first coordinate.

In one embodiment, the processor 603 may also adjust the second display area 310 to the first display area 302 when the first operation sensed by the sensor 602 is ended. In another embodiment, the processor 603 may also hold the second display area 310 when the first operation sensed by the sensor 602 is ended. Then the sensor 602 may sense a second operation performed on the display screen 301. According to the information of the second operation sensed by the sensor 602, the processor 603 may adjust the second display area 310 to the first display area 302.

The display method provided in the present disclosure may determine the first contact area 305 of the display screen 301 in contact with the operation body of the first operation based on the first operation performed on the display screen 301 of the electronic device, and then adjust the first display area 302 of the display screen 301 to the second display area 310. After the adjustment, for example, the contents displayed in the first contact area 305 may be stopped displaying. Thus, even the user touches the first contact area 305 with hand, error response of the electronic device may not occur and the error response rate of the electronic device may be reduced. Further, the frame of the electronic device may be made narrower to expand the size of the display area and enhance the user's experience.

The device and method described in the above embodiments may be realized through other approaches. That is, the description on the methods and devices in the above embodiments may only be schematic examples. For instance, the modules or units may be merely defined based on their logical functions, and in actual applications, the modules or units may be defined based on other criteria.

For example, multiple units or components may be combined together or be integrated into another system, or some features may be ignored or may not be executed. Moreover, the coupling between the modules, units, and components illustrated or discussed above may be direct coupling or communication connections through some indirect coupling or communication connections between interfaces, devices, or units. The coupling may be electrical, mechanical or in any other appropriate form.

The modules or units described separately above, may or may not be physically separated. Each component illustrated and discussed above as a unit may or may not be a physical unit. That is, the component may be located at a certain position, or may be distributed to multiple network units. Moreover, based on the needs of actual applications, all or a part of the units may be used to realize the methods consistent with disclosed embodiments.

Further, various functional units discussed in the disclosed embodiments may be integrated in a single processing unit or may be physically independent from each other. In addition, a plurality of units formed by integrating two or more than two functional units together may further form a processing unit. The integrated units described above may be realized through hardware or through software functional units.

When the integrated units are realized through software functional units, and are sold and used as independent products, the integrated units may be stored on computer readable storage media. Based on this understanding, all or a part of the generic principles or the scope of the invention may be embodied in software products. The computer software products may be stored in storage media and may include a plurality of commands to instruct a computer system (such as personal computer, server, network system, etc.) or a processor to execute all or a part of the procedures described in various embodiments consistent with the present disclosure. The storage media may include U disk, mobile hard disk, read-only memory (ROM), random access memory (RAM), magnetic disk, optical disk, or any other appropriate media that can be used to store program code.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display method, comprising:
sensing a first operation performed by an operation body with respect to a display screen of an electronic device;
determining whether the first operation is performed in contact with the display screen;
in response to determining that the first operation is not performed in contact with the display screen, determining whether a distance between the operation body and the display screen is less than a predetermined distance;
determining a blocked area of the display screen corresponding to the first operation based on information of the first operation, including, based on the information of the first operation:
determining the blocked area of the display screen corresponding to the first operation in response to determining that the first operation is performed in contact with the display screen; and
determining the blocked area of the display screen corresponding to the first operation in response to determining that the first operation is not performed in contact with the display screen and the distance between the operation body and the display screen is less than the predetermined distance;
determining whether the blocked area is within a predetermined area of the display screen;
adjusting, if the blocked area is within the predetermined area of the display screen, a first display area of the display screen to a second display area based on information of the blocked area, wherein:
a touch display function is disabled for a portion of the display screen that is outside the second display area,
entire displayed content displayed in the first display area is resealed to be displayed in the second display area, and
a display function is disabled for a portion of the display screen that is outside the second display area;
displaying, in response to sensing the end of the first operation, a prompt message;
determining whether a selection operation on the prompt message is sensed;
maintaining the second display area, in response to sensing the end of the first operation, determining that the selection operation on the prompt message is sensed, and information of the selection operation indicating that the operation body chooses not to restore the first display area;
adjusting the second display area back to the first display area, in response to sensing the end of the first operation, determining that the selection operation on the prompt message is sensed, and the information of the selection operation indicating the operation body chooses to restore the first display area; and maintaining the second display area for a predetermined period of time before adjusting the second display area to the first display area, in response to sensing the end of the first operation and determining that the selection operation on the prompt message is not sensed.

2. The method according to claim 1, wherein:
a size of the second display area is smaller than a size of the first display area.

3. The method according to claim 1, wherein adjusting the first display area of the display screen to the second display area further comprises:
determining whether a duration of the first operation is larger than a predetermined duration if the blocked area is within the predetermined area; and
adjusting the first display area of the display screen to the second display area if the duration of the first operation is larger than the predetermined duration.

4. The method according to claim 1, wherein adjusting the first display area of the display screen to the second display area based on the information of the blocked area includes:
determining a first coordinate of the blocked area in the first display area; and
scaling down the size of the first display area along a predetermined first direction based on the first coordinate to obtain the second display area.

5. The method according to claim 4, wherein:
the first coordinate is a coordinate in a predetermined coordinate system.

6. The method according to claim 1, wherein:
at least a portion of the blocked area is outside the second display area.

7. The method according to claim 4, wherein determining the first coordinate of the blocked area in the first display area includes:
determining an outer contour trajectory of the blocked area; and
determining a coordinate of a farthest point on the outer contour trajectory along the predetermined first direction as the first coordinate.

8. The method according to claim 1, wherein the first operation is a grip operation.

9. An electronic device, comprising:
a display screen;
a sensor; and
a processor,
wherein the sensor senses a first operation performed by an operation body with respect to the display screen; and
the processor is configured to:
determine whether the first operation is performed in contact with the display screen;
in response to determining that the first operation is not performed in contact with the display screen, determine whether a distance between the operation body and the display screen is less than a predetermined distance;
determine a blocked area of the display screen corresponding to the first operation based on information of the first operation sensed by the sensor, wherein determining the blocked area including, based on information of the first operation sensed by the sensor:
determining the blocked area of the display screen corresponding to the first operation in response to determining that the first operation is performed in contact with the display screen; and
determining the blocked area of the display screen corresponding to the first operation in response to determining that the first operation is not performed in contact with the display screen and the distance between the operation body and the display screen is less than the predetermined distance;
determine whether blocked contact area is within a predetermined area of the display screen;
adjust a first display area of the display screen to a second display area based on information of the blocked area if the blocked area is within the predetermined area of the display screen, wherein:
a touch display function is disabled for a portion of the display screen that is outside the second display area,
entire displayed content displayed in the first display area is rescaled to be displayed in the second display area, and
a display function is disabled for a portion of the display screen that is outside the second display area;
display, in response to sensing the end of the first operation, a prompt message;
determine whether a selection operation on the prompt message is sensed;
maintain the second display area, in response to sensing the end of the first operation, determining that the selection operation on the prompt message is sensed, and information of the selection operation indicating that the operation body chooses not to restore the first display area;
adjust the second display area back to the first display area, in response to sensing the end of the first operation, determining that the selection operation on the prompt message is sensed, and the information of the selection operation indicating the operation body chooses to restore the first display area; and
maintain the second display area for a predetermined period of time before adjusting the second display area to the first display area, in response to sensing the end of the first operation and determining that the selection operation on the prompt message is not sensed.

10. The electronic device according to claim 9, wherein:
a size of the second display area is smaller than a size of the first display area.

11. The electronic device according to claim 9, wherein the processor:
determines whether a duration of the first operation is larger than a predetermined duration in response to the blocked area being within the predetermined area before adjusting the first display area of the display screen to the second display area; and
adjusts the first display area to the second display area in response to the duration of the first operation being larger than the predetermined duration.

12. The electronic device according to claim 9, wherein adjusting the first display area of the display screen to the second display area based on the information of the blocked area by the processor includes:
determining a first coordinate of the blocked area in the first display area; and scaling down the size of the first display area along a predetermined first direction based on the first coordinate to obtain the second display area.

13. The electronic device according to claim 9, wherein:
at least a portion of the blocked area is outside the second display area.

14. The electronic device according to claim 12, wherein determining the first coordinate of the blocked area in the first display area by the processor includes:
determining an outer contour trajectory of the blocked area; and
determining a coordinate of a farthest point on the outer contour trajectory along the predetermined first direction as the first coordinate.

* * * * *